(No Model.)
T. H. SWEETING.
TIRE FOR BICYCLE WHEELS.
No. 485,898. Patented Nov. 8, 1892.
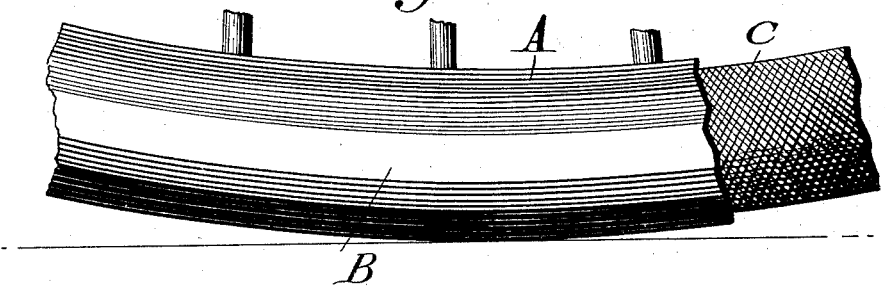
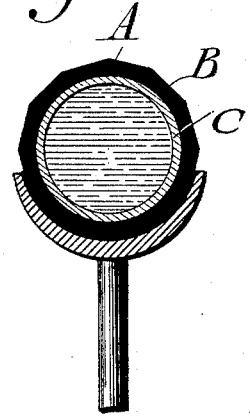
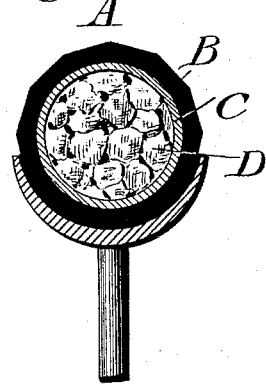
WITNESSES:
INVENTOR
Thomas Henry Sweeting
BY
ATTORNEY.

UNITED STATES PATENT OFFICE.

THOMAS HENRY SWEETING, OF PHILADELPHIA, PENNSYLVANIA.

TIRE FOR BICYCLE-WHEELS.

SPECIFICATION forming part of Letters Patent No. 485,898, dated November 8, 1892.

Application filed June 15, 1892. Serial No. 436,796. (No model.)

*To all whom it may concern:*

Be it known that I, THOMAS HENRY SWEETING, a citizen of the United States, residing in the city and county of Philadelphia, State of Pennsylvania, have invented a new and useful Improvement in Tires for Bicycles, which improvement is fully set forth in the following specification and accompanying drawings.

My invention consists of a tire for a bicycle, &c., formed as hereinafter set forth.

Figure 1 represents a side elevation of a tire embodying my invention. Figs. 2 and 3 represent transverse sections thereof.

Similar letters of reference indicate corresponding parts in the several figures.

Referring to the drawings, A designates a tire, which is formed of an exterior elastic or rubber tube B and an inner strengthening-tube C, of canvas or other flexible fabric; but to the material of the inner tube I do not limit myself.

The tire is filled with water, which provides a highly-elastic cushion, and furthermore filled with sponge or other absorbent, which expands the tire, thus increasing the cushioning nature of the tire, it being seen that when the wheel is running the vibrations of the same are reduced to a minimum or almost entirely prevented.

The periphery of the tire is polygonal in cross-section, whereby when the same flattens out, due to the load thereon, a broad tread is presented to the ground, whereby slipping of the wheel is prevented.

The tire is seated in a metallic or other rim, to which latter the spokes are attached in any suitable manner.

Having thus described my invention, what I claim as new, and desire to secure by Letters Patent, is—

1. A tire formed of an exterior elastic tube, a flexible inner strengthening-tube, a liquid within said tubes, and an absorbent material in said liquid, said parts being combined substantially as described.

2. A tire formed of an exterior elastic tube having an angular contact outer face, a flexible inner tube, a liquid filling within said tube, and an absorbent material in said liquid, said parts being combined substantially as described.

THOMAS HENRY SWEETING.

Witnesses:
JOHN A. WIEDERSHEIM,
A. P. JENNINGS.